May 1, 1945.  M. J. MITCHELL  2,375,020
SLIP CLUTCH
Filed Dec. 27, 1943
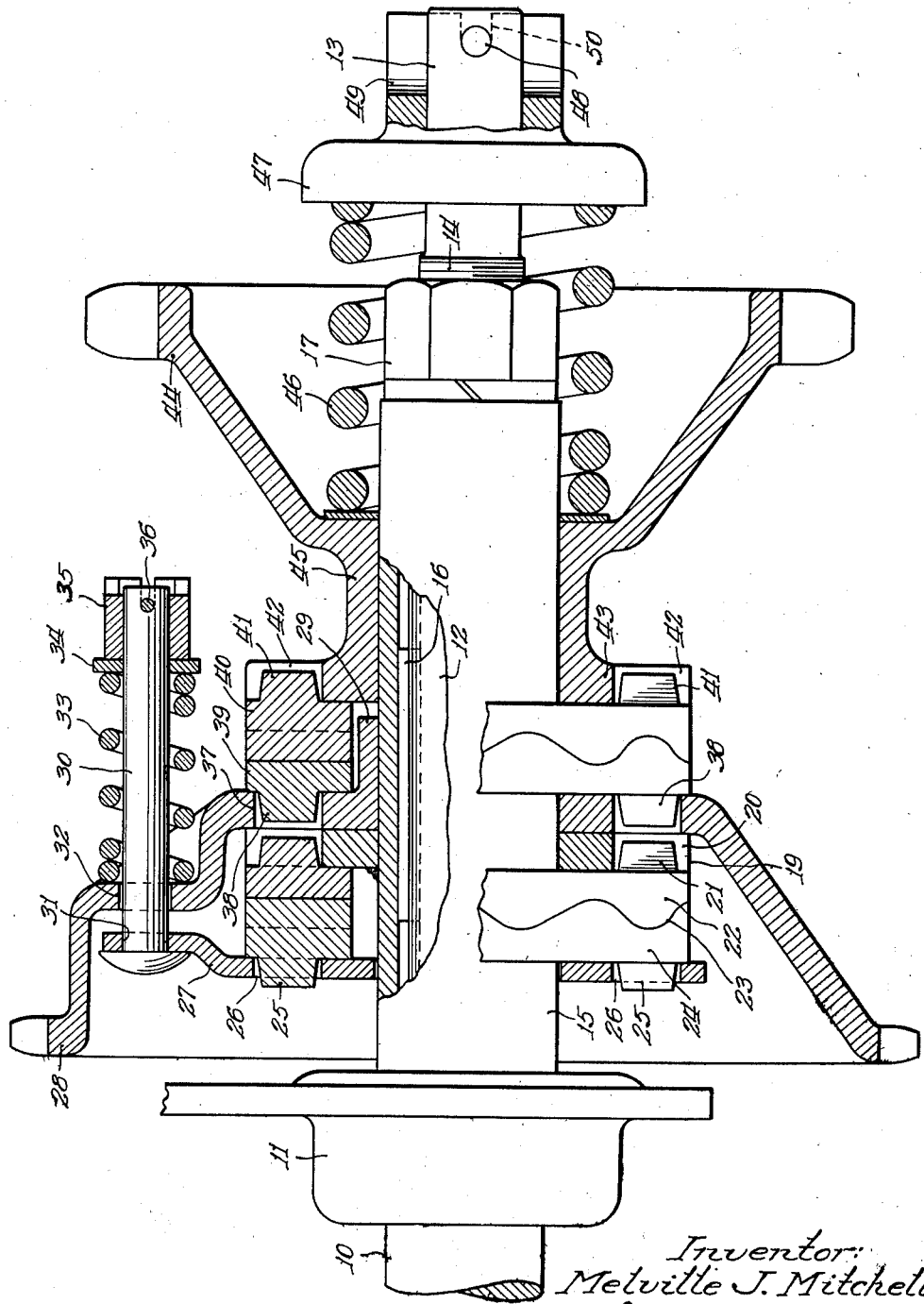
Inventor:
Melville J. Mitchell
By: Paul O. Pippel
Atty.

Patented May 1, 1945

2,375,020

UNITED STATES PATENT OFFICE 2,375,020

SLIP CLUTCH

Melville J. Mitchell, Highland Park, Ill., assignor to International Harvester Company, a corporation of New Jersey Application December 27, 1943, Serial No. 515,687

12 Claims. (Cl. 64—29)

The present invention relates to slip clutches such as are commonly employed in power transmitting connections where they serve as overload relief devices to prevent the breakage of driving or driven parts in the event of overloading of the driven mechanism.

The principal object of the invention is to provide a simplified compact clutch device by means of which power can be transmitted to two independent operating mechanisms with individual and independently operable slip clutch devices in each of the power connections, whereby one mechanism may stop without stopping the other.

Other objects and advantages of the invention will appear in the following description of a preferred embodiment thereof.

In the accompanying drawing, illustrating the invention, the single figure is substantially a section through the center line of a slip clutch mechanism with portions of the clutch disks and certain other elements being shown in elevation.

In the drawing, a driven shaft 10 is illustrated which, for example, may be the crank axle of a thresher when the device is employed on an agricultural implement of this type. The shaft 10 is suitably supported by such means as may include a bearing structure 11. The shaft extends beyond the bearing structure in an overhanging position, the overhanging portion including a shaft extension 12 of reduced diameter and a further extension 13 of a further reduced diameter, said extension 12 having a threaded portion 14.

A cylindrical sleeve 15 is fitted on the extension 12 of the shaft 10 being secured against rotation by a key 16. Said sleeve is held on the shaft by a nut 17. The structure described to this point is merely one type of a shaft construction which, insofar as the invention is concerned, may be considered as unitary shaft.

The sleeve 15 carries a flange or disk-like driven member 19 spaced from the bearing structure 11, said member is secured to the sleeve 15 by welding as indicated.

The driven member 19 is provided with a plurality of notches 20, around its periphery, to provide for the reception of driving lugs 21 on a clutch disk 22. Said disk has a corrugated type of face 23 of the type conventionally used for agricultural slip clutches. Said face engages with a similarly formed face on an exactly identical clutch disk member 24. Said disk is formed with driving lugs 25 which are fitted in openings 26 formed in a driving member 27. The member 27 is concentrically arranged with respect to sleeve 15 and is mounted for rotation relative to the sleeve.

A driving member in a form of a sprocket 28 is provided with a hub portion 29 which is rotatably mounted on the sleeve 15. Said sprocket abuts the driven member 19 on the side thereof opposite the clutch disk 22. Resilient pressure is obtained to act on the clutch disks 22 and 24 by means of pins 30, one of which is shown extending through alined holes 31 and 32, formed respectively in the driving member 27 and in the sprocket. Each pin 30 is surrounded by a compression spring 33 which is retained by a washer 34 and a nut 35 held in position on the pin by a small pin or cotter-key 36. The nut 35 is provided with a plurality of notches of a different depth to provide for adjusting the spring pressure on the clutch disks 22 and 24.

The sprocket 28 is provided with a plurality of openings 37 to receive driving lugs 38 on a clutch disk 39. Said disk engages the face of an identical disk 40, the driving lugs 41 of which fit into openings 42 of a flange 43 formed on a driven sprocket 44. The said sprocket has a hub portion 45 which is rotatably fitted on the sleeve 15. A compression spring 46 abutting the sprocket 44 and a stop member 47 provides means for resiliently urging the clutch disks 39 and 40 into engaging position. The stop member 47 is held on the reduced extension 13 of the shaft 10 by a pin 48. The stop member is provided with notches 49 and 50 of different depth to provide means for holding the force of the compression spring 46 on the clutch parts.

In the operation of the clutch device as described, power is applied through the driving member 28 and therefrom through the driving member 27. The clutch disks 24 and 39 are thereby driven, being the two input sides of the two slip clutches. An overload on the shaft 10 beyond the capacity of the clutch as determined by the compression of the springs 33 causes relative slippage of the clutch disks 22 and 24. Such slippage does not, however, affect the continued drive to the sprocket 44 which is used to drive an independent mechanism, for example, the elevator of a thresher device. It is very desirable in certain machines to maintain the driving of one mechanism of the machine, although another mechanism has been clogged or jammed, thereby preventing its operation.

Whenever the mechanism driven by the sprocket 44 is overloaded, the clutch disks 39 and 40 may slip without affecting the transmission of power to the shaft 10. It will, therefore, be understood that an entirely independent slip clutch mechanism has been provided in the device described for either of two driven mechanisms which have the same source of power. The clutch mechanisms have been incorporated in a simple, compact unitary device which can be readily assembled on the projecting end of a driven shaft, the shaft being one of the driven elements and a member rotatably carried on the shaft being a second driven member.

Only a preferred embodiment of applicant's improved slip clutch device has been illustrated. It is to be understood that all modifications falling within the appended claims are contemplated as part of the invention.

What is claimed is:

1. A slip clutch construction comprising a driven shaft having a clutch disk carried thereby, a driven member rotatably mounted on said shaft and having a clutch disk carried thereby, a driving structure rotatably mounted on the driven shaft and having clutch disks carried thereby engageable with the aforesaid clutch disks, and resilient means operative to urge the respective pairs of clutch disks together.

2. A slip clutch construction comprising a driven shaft having a clutch disk carried thereby, a driven member rotatably mounted on said shaft and having a clutch disk carried thereby, a driving structure rotatably mounted on the driven shaft and having clutch disks carried thereby engageable with the aforesaid clutch disks, and independent resilient means operative to independently urge the respective pairs of clutch disks together.

3. A slip clutch construction comprising a driven shaft having an abutment flange thereon, a clutch disk carried by said flange, a driven member rotatably mounted on said shaft and having a clutch disk carried thereby, a driving structure rotatably mounted on the driven shaft and having spaced clutch disks carried thereby engageable with the aforesaid clutch disks, and resilient means operative to urge the respective pairs of clutch disks together against said abutment flange.

4. In a slip clutch construction, a driven shaft having an abutment thereon, a driving structure having spaced members on opposite sides of said abutment, means for resiliently urging said spaced members together, a pair of mating clutch disks carried respectively by and between one of said members and said abutment, a driven member spaced from one of said driving members, means for resiliently urging said driven member toward said driving member and a second pair of mating clutch disks carried by and between said driven member and said driving member.

5. In a slip clutch construction, a driven shaft having an abutment flange thereon, a driving structure including a drive sprocket abutting said flange and a member resiliently connected thereto and spaced from the opposite side of said abutment, a pair of mating clutch disks carried respectively by and between said member and said abutment flange, a driven member spaced from said sprocket, means for resiliently urging said driven member toward said sprocket and a second pair of mating clutch disks carried by and between said driven member and said sprocket.

6. In a slip construction, a driven shaft having an abutment thereon, a driving structure including a sprocket and a spaced member resiliently connected thereto, said member and said sprocket being on opposite sides of said abutment, a pair of mating clutch disks carried respectively by and between said member and said abutment, a driven member spaced from said sprocket, means for resiliently urging said driven member toward said sprocket and a second pair of mating clutch disks carried by and between said driven member and said sprocket.

7. A slip clutch device comprising a driven shaft, an annular flange on said shaft carrying a clutch disk at one side thereof, a member carrying a second clutch disk engageable with said first mentioned disk, a driving member abutting the flange on the side opposite the clutch disks, means for resiliently urging the clutch disk carrying member towards said driving member, a clutch disk carried by the driving member on the side thereof opposite the flange, a driven member rotatably mounted on the driven shaft, a clutch disk carried by said driven member engageable with the clutch disk on the driving member and resilient means for urging the driven member toward the driving member.

8. In a slip clutch device, a driven shaft, an annular flange on said shaft, a driven clutch disk carried by said flange at one side thereof, a driving clutch disk engageable with said clutch disk, a carrier member for said second mentioned clutch disk, a driving member mounted for rotation on said driven shaft, said member abutting the flange on the side opposite the clutch disks, spring means for resiliently urging the carrier member towards said driving member for exerting pressure on the clutch disks, a driving clutch disk carried by the driving member on the side thereof opposite the flange, a driven member rotatably mounted on the driven shaft, a driven clutch disk carried by said driven member engageable with the clutch disk on the driving member and resilient means for urging the driven member toward the driving member.

9. In a slip clutch device, a driven shaft, an annular member secured to said shaft, a clutch disk carried by said member at one side thereof, a driving clutch disk engageable with said clutch disk, a carrier member for said second mentioned clutch disk, a driving member mounted for rotation on said driven shaft, said member abutting the annular member on the side opposite the clutch disk, spring means for resiliently urging the carrier member towards said driving member for exerting pressure on the clutch disks, a clutch disk carried by the driving member on the side thereof opposite the annular member, a driven member rotatably mounted on the driven shaft, a clutch disk carried by said driven member engageable with the clutch disk on the driving member and resilient means for urging the driven member toward the driving member for maintaining pressure against the clutch disks mounted therebetween.

10. In a slip clutch device, a driven shaft, an annular member secured to said shaft, a clutch disk carried by said member at one side thereof, a driving clutch disk engageable with said clutch disk, a carrier member for said second mentioned clutch disk, a driving sprocket mounted for rotation on said driven shaft, said member abutting the annular member on the side opposite the clutch disk, spring means for resiliently urging the carrier member towards said driving sprocket for exerting pressure on the clutch disks, a clutch disk carried by the driving sprocket on the side thereof opposite the annular member, a driven sprocket rotatably mounted on the driven shaft, a clutch disk carried by said driven sprocket engageable with the clutch disk on the driving member and resilient means for urging the driven sprocket toward the driving sprocket for maintaining pressure against the clutch disks mounted therebetween.

11. In a slip clutch device, a driven shaft, an annular flange on said shaft, a driven clutch disk carried by said flange at one side thereof, a driving clutch disk engageable with said clutch disk, a carrier member for said second mentioned clutch disk, a driving member mounted for rotation on said driven shaft, said driving member abutting the flange on the side opposite the clutch disks, spring means for resiliently urging the carrier member towards said driving member for exerting pressure on the clutch disks, a driving clutch disk carried by the driving member on the side thereof opposite the flange, a driven member rotatably mounted on the driven shaft, a driven clutch disk carried by said driven member engageable with the clutch disk on the driving member, a compression spring surrounding the shaft and abutting the driven member, and a stop member abutting said spring and adjustably secured to the shaft.

12. In a slip clutch device, a driven shaft, an annular member secured to said shaft, a clutch disk carried by said member at one side thereof, a driving clutch disk engageable with said clutch disk, a carrier member for said second mentioned clutch disk, a driving sprocket mounted for rotation on said driven shaft, said driving sprocket abutting the annular member on the side opposite the clutch disk, spring means for resiliently urging the carrier member towards said driving sprocket for exerting pressure on the clutch disks, a clutch disk carried by the driving sprocket on the side thereof opposite the annular member, a driven sprocket rotatably mounted on the driven shaft, a clutch disk carried by said driven sprocket engageable with the clutch disk on the driving member and a compression spring surrounding the shaft and abutting said driven sprocket, and a stop member abutting said spring and adjustably secured to the shaft.

MELVILLE J. MITCHELL.